US011150913B2

United States Patent
Liang

(10) Patent No.: US 11,150,913 B2
(45) Date of Patent: Oct. 19, 2021

(54) METHOD, DEVICE, AND TERMINAL FOR ACCELERATING STARTUP OF APPLICATION

(71) Applicant: GUANGDONG OPPO MOBILE TELECOMMUNICATIONS CORP., LTD., Guangdong (CN)

(72) Inventor: Kun Liang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 105 days.

(21) Appl. No.: 16/605,790

(22) PCT Filed: Apr. 19, 2017

(86) PCT No.: PCT/CN2017/081099
§ 371 (c)(1),
(2) Date: Oct. 16, 2019

(87) PCT Pub. No.: WO2018/191888
PCT Pub. Date: Oct. 25, 2018

(65) Prior Publication Data
US 2020/0125369 A1    Apr. 23, 2020

(51) Int. Cl.
*G06F 9/46* (2006.01)
*G06F 9/445* (2018.01)
(Continued)

(52) U.S. Cl.
CPC .............. *G06F 9/445* (2013.01); *G06F 9/485* (2013.01); *H04M 1/72403* (2021.01); *G06F 2209/482* (2013.01)

(58) Field of Classification Search
CPC .... G06F 9/445; G06F 9/485; G06F 2209/482; H04M 1/72403
See application file for complete search history.

(56) References Cited

U.S. PATENT DOCUMENTS

2004/0030882 A1    2/2004  Forman
2012/0167122 A1*   6/2012  Koskimies ............ G06F 9/5027
                                                        719/328
(Continued)

FOREIGN PATENT DOCUMENTS

CN    101222709    8/2011
CN    104899090    9/2015
(Continued)

OTHER PUBLICATIONS

EPO, Office Action for EP Application No. 17906754.1, dated Mar. 27, 2020.
(Continued)

*Primary Examiner* — Diem K Cao
(74) *Attorney, Agent, or Firm* — Hodgson Russ LLP

(57) ABSTRACT

The embodiment of the disclosure discloses a method, a device, and a terminal for accelerating the startup of an application. The method includes the steps of: creating a process of a preset application; suspending the process of the preset application after creating the process of the preset application; monitoring a start signal of the preset application; and activating the process of the preset application when the start signal is detected.

20 Claims, 6 Drawing Sheets

(51) Int. Cl.
    *G06F 9/48*     (2006.01)
    *H04M 1/72403*     (2021.01)

(56) References Cited

U.S. PATENT DOCUMENTS

| 2012/0324481 | A1* | 12/2012 | Xia | G06F 9/485 |
| | | | | 719/320 |
| 2013/0173513 | A1* | 7/2013 | Chu | G06F 9/451 |
| | | | | 706/14 |
| 2014/0122858 | A1 | 5/2014 | Tsai et al. | |

FOREIGN PATENT DOCUMENTS

| CN | 105389174 | 3/2016 |
| CN | 105893087 | 8/2016 |

OTHER PUBLICATIONS

WIPO, ISR for PCT/CN2017/081099, dated Dec. 26, 2017.
IPI, Office Action for IN Application No. 201917042651, dated Mar. 31, 2021.
EPO, Communication for EP Application No. 17906754.1, dated Feb. 25, 2021.
Vimal et al., "A memory management scheme for enhancing performance of applications on Android," IEEE Recent Advances in Intelligent Computational Systems (RAICS), 2015, pp. 162-166.

\* cited by examiner

METHOD, DEVICE, AND TERMINAL FOR ACCELERATING STARTUP OF APPLICATION

CROSS-REFERENCE TO RELATED APPLICATION

This application is a U.S. national phase application of International Application No. PCT/CN2017/081099, filed Apr. 19, 2017, the entire disclosure of which is incorporated herein by reference.

TECHNICAL FIELD

The present disclosure relates to the field of communications technologies, and more particular, to a method, a device, and a terminal for accelerating the startup of an application.

BACKGROUND

Mobile users open and close applications on their phones many times every day. The speed at which the application is started is an important factor in the improvement of the user experience. Most users want to start the application as fast as possible.

The startup of the application involves the creation of processes, the loading of resources, and the normal flows of operations. In order to speed up the startup of the application, some current solutions are not to end the processes for common applications such as WeChat, so that the processes are resident in the background. However, the resident processes will waste the memory resources of the mobile phone and affect the operations of other applications.

SUMMARY

An embodiment of the disclosure provides a method, a device, and a terminal for accelerating the startup of an application, with the effects of improving the startup of an application.

An embodiment of the disclosure provides a method for accelerating the startup of an application, which includes the following steps:
creating a process of a preset application;
suspending the process of the preset application after creating the process of the preset application;
monitoring a start signal of the preset application; and
activating the process of the preset application when the start signal is detected.

An embodiment of the disclosure provides a method for accelerating the startup of an application, which includes the following steps:
creating a process of a preset application;
suspending the process of the preset application after creating the process of the preset application;
monitoring a start signal of the preset application; and
activating the process of the preset application when the start signal is detected;
wherein the operation of creating a process of a preset application includes:
determining whether a remaining memory for running the application satisfies a preset condition, when detecting that a previous process of the preset application is ended;
re-creating a process of the preset application when the remaining memory satisfies the preset condition;
acquiring usage characteristic information of an application currently running in the background when the remaining memory fails to satisfy the preset condition;
terminating the application whose usage characteristic information meets a default terminating condition;
determining whether the remaining memory for running the preset application satisfies the preset condition, after terminating the application whose usage characteristic information meets a default terminating condition; and
re-creating a process of the preset application when the remaining memory satisfies the preset condition.

An embodiment of the disclosure provides a method for accelerating the startup of an application, which includes the following steps:
creating a process of a preset application;
suspending the process of the preset application after the process of the preset application is created successfully a predetermined period of time;
monitoring a start signal of the preset application; and
activating the process of the preset application when the start signal is detected;
wherein the operation of creating a process of a preset application includes:
querying running characteristic information of each application in an application list, when detecting that the system is started;
selecting at least one application from the application list as the preset application according to the running characteristic information;
creating a process of the at least one preset application.

An embodiment of the disclosure provides a method for accelerating the startup of an application, which includes the following steps:
creating a process of a preset application;
suspending the process of the preset application after the process of the preset application is created and initialized;
monitoring a start signal of the preset application; and
activating the process of the preset application when the start signal is detected;
wherein the operation of creating a process of a preset application comprises:
querying running characteristic information of each application in an application list, when detecting that the system startup is completed;
selecting at least one application from the application list as the preset application according to the running characteristic information; and
creating a process of the at least one preset application.

An embodiment of the disclosure provides a device for accelerating the startup of an application, which includes:
a creating module, configured to create a process of a preset application;
a suspending module, configured to suspend the process of the preset application after creating the process of the preset application;
a monitoring module, configured to monitor a start signal of the preset application; and
an activating module, configured to activate the process of the preset application when the start signal is detected.

An embodiment of the disclosure provides a device for accelerating the startup of an application, which includes:
a creating module, configured to create a process of a preset application;
a suspending module, configured to suspend the process of the preset application after creating the process of the preset application a predetermined period of time;

a monitoring module, configured to monitor a start signal of the preset application; and an activating module, configured to activate the process of the preset application when the start signal is detected; wherein the creating module includes:

a first acquiring unit, configured to acquire usage characteristic information of an application currently running in the background when the remaining memory fails to satisfy the preset condition;

a terminating unit, configured to terminate the application whose usage characteristic information meets a default terminating condition;

a second acquiring unit, configured to determine whether the remaining memory for running the application satisfies the preset condition, after ending the application whose usage characteristic information meets a default terminating condition;

a second creating unit, configured to re-create a process of the preset application when the remaining memory satisfies the preset condition.

An embodiment of the disclosure provides a device for accelerating the startup of an application, which includes:

a creating module, configured to create a process of a preset application;

a suspending module, configured to suspend the process of the preset application after creating the process of the preset application a predetermined period of time;

a monitoring module, configured to monitor a start signal of the preset application; and an activating module, configured to activate the process of the preset application when the start signal is detected; wherein the creating module includes:

a querying unit, configured to query running characteristic information of each application in an application list, when detecting that the system is started;

a selecting unit, configured to select at least one application from the application list as the preset application according to the running characteristic information;

a creating unit, configured to create a process of the at least one preset application.

An embodiment of the disclosure provides a terminal, which includes a memory, a processor, and a computer program stored in the memory and executable for the processor, the processor performs the above described method when executing the computer program.

It can be seen that the embodiment of the disclosure quickly starts a preset application by: creating a process of a preset application; suspending the process of the preset application after creating the process of the preset application; monitoring a start signal of the preset application; and activating the process of the preset application when the start signal is detected. Since the process of the preset application has been pre-established and suspended before the preset application is started, the process is activated when the startup signal of the preset application is detected, so that the preset application can be started quickly, and the startup speed of the application can be improved.

DETAILED DESCRIPTION

Figure 1:
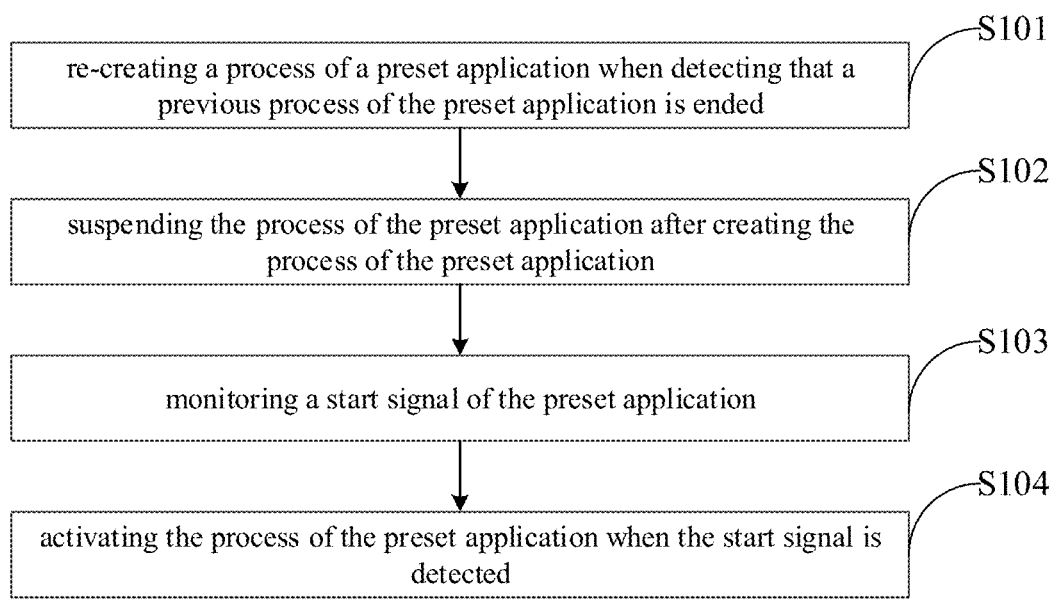
FIG. 1 is a first flow chart of a method for accelerating the startup of an application in an embodiment of the disclosure.

Referring to the drawings, the same reference numerals refer to the same components, the principles of the disclosure are illustrated in a suitable computing environment. The following description is based on the specific embodiments of the disclosure, and should not to be construed as limiting the embodiments of the disclosure not specifically described herewith.

In the following description, the specific embodiments of the disclosure will be described with reference to the steps and symbols of the operations performed by one or more computers, unless otherwise stated. Thus, it will be appreciated that these steps and operations, several of which are referred to as being performed by a computer, include manipulations of a computer processing unit that represents an electronic signal of data in a structured version. These manipulations convert the data or maintains it at a location in the memory system of the computer, which can be reconfigured or otherwise alter the operation of the computer in a manner well known to those skilled in the art. The data structure maintained by the data is the physical location of the memory, which has specific characteristics defined by the data format. However, the principles of the present disclosure are described as the above wordings, which should not consider to be a limitation, and those skilled in the art will appreciate that various steps and operations described below can also be implemented in hardware.

FIG. 1 is a flow chart of a method for accelerating the startup of an application in an embodiment of the disclosure, which is mainly applied to a terminal such as a mobile phone, an IPAD, a computer, and the like. In this embodiment, the method includes the following steps:

S101, a process of a preset application is created.

This step is mainly applied to such a scenario when the process of the preset application ends. In this scenario, the step S101 is: a current process of the preset application is re-created, when detecting that a previous process of the preset application is ended.

An application list is preset and stored in the terminal, and there are applications listed in the application list and considered as preset applications. Preset applications is used more frequently. When an application in the terminal is closed, it is determined whether it is a preset application in the application list. If the closed application is one of the preset applications, a process of the preset application is re-created. For example, QQ or WeChat is a preset application with a high frequency in use. When detecting that the process of QQ or WeChat is ended, it is confirmed as the preset application in the application list, and then the process of WeChat or QQ is re-created. In a specific application, a processor of the terminal uses a broadcast to force the process of the preset application by simulating the BOOT_COMPLETED broadcast.

Figure 2:
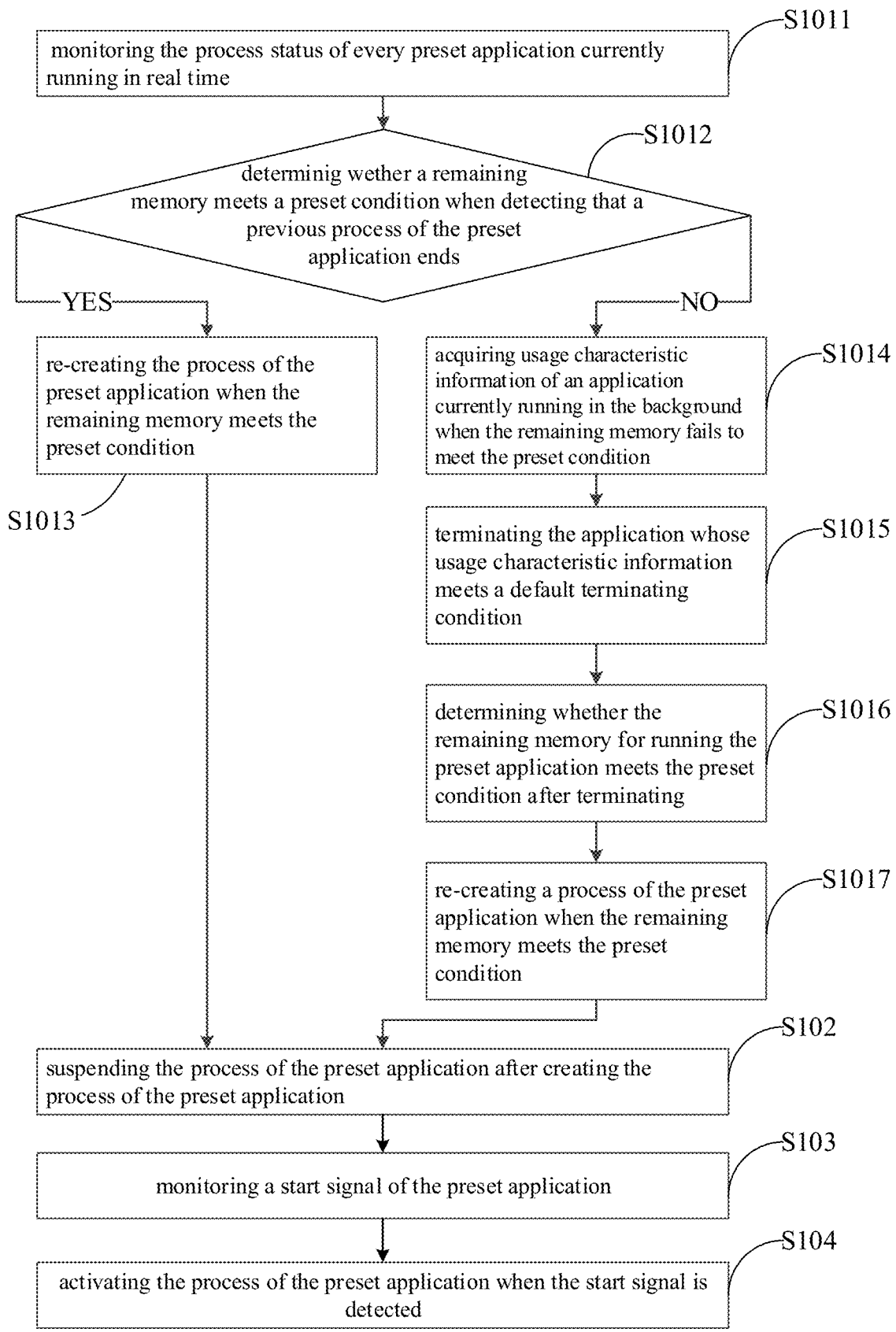
FIG. 2 is a detailed flowchart of the method for accelerating the startup of an application as shown in FIG. 1.

In some embodiments, since the terminal has been running for a period of time, it is possible that a remaining memory for running the preset application is insufficient, and the remaining memory needs to be checked before the subsequent steps can be performed. Please referring to FIG. 2, the step S101 includes the following sub-steps in this case.

S1011: every currently running application is real-time monitored. The terminal monitors the process status of each application in the application list in real time.

S1012: when detecting that the process of the preset application is ended, it is determined whether the remaining memory used to run applications meets a preset condition. In this step, when the process of the preset application ends, the running cache of the preset application is automatically cleared. The preset condition refers to whether the remaining memory is greater than a predetermined value such that the preset application has enough memory to create a process thereof, for example, the predetermined value may be 512 Mb or 1 Gb.

S1013: the process of the preset application is re-created, when the remaining memory meets the preset condition. In this step, if the remaining memory satisfies the preset condition that greater than a predetermined value, such as 512 Mb or 1 Gb, the process of the preset application is re-created. In a specific application, the processor of the terminal uses a broadcast to force the process of the preset application by simulating the BOOT_COMPLETED broadcast.

S1014: usage characteristic information of an application currently running in the background is acquired, when the remaining memory does not meet the preset condition. In this step, when the remaining memory does not satisfy the preset condition, that is, when the remaining memory is less than the predetermined value, the identification information of the application currently running in the background is extracted. The usage characteristic information of the corresponding application is queried according to the identification information thereof. The usage characteristic information may be a usage frequency of the corresponding application, the time of the last click of the application, the total operation time of each application, and the like.

S1015: the application whose usage characteristic information meets the preset condition is closed. In this step, when the usage characteristic information is the usage frequency of the corresponding application, the applications running in the background are sorted in order of usage frequency from low to high, and close several applications in the front of the order, thus freeing up memory space. For instance, applications such as mobile banking, Alipay, etc., running in the background, are automatically closed to free up memory space.

It can be understood that the usage characteristic information may further include a usage frequency f of the corresponding application, a time T of the last click of the application, a total operation time L of each application, and the like. The characteristic value of the usage characteristic information is $Q=af+bT+cL$, where a, b, and c are coefficients obtained by big data statistics. The applications, running in the background, are sorted in order of the characteristic value from small to large, and clears the processes of at least two applications in the front of the order, thereby freeing up memory space.

S1016: after closing the application whose usage characteristic information meets the preset condition, it is determined whether the remaining memory meets the preset condition. In this step, it is determined whether the remaining memory is greater than the predetermined value, such as 512 Mb or 1 Gb, etc., which is related to the memory space required to run the preset application.

S1017: the process of the preset application is re-created when the remaining memory meets the preset condition. In this step, if the remaining memory still fails to satisfy the preset condition, the step S1015 is operated again until the preset condition is met.

S102, the process of the preset application is suspended after creating the process of the preset application.

In this step, after the process of the preset application is successfully created and is delayed a predetermined time, the process of the preset application is suspended. In the specific application process, the system delays n seconds (for example, n=5), and sends a sigstop instruction to the process of the preset application to pause it. Here, the system delays the predetermined time to give the process a certain period of time to perform initializing operations.

S103, a start signal of the preset application is monitored.

After the operation of suspending the process of the preset application in step S102 is completed, a real-time monitoring instruction is turned on to monitor the start signal of the preset application. The start signal mainly refers to receiving an input instruction to open the preset application by manually. For example, it is monitored whether the user clicks the icon of the preset application. Alternatively, the start signal may be automatically triggered by the system, for example, the system automatically generates an instruction to open the Alipay during the payment process.

S104, the process of the preset application is activated when the start signal is detected.

In this step, after the process of the preset application is activated, the running resources are automatically loaded, so that the preset application quickly completes the startup operation.

Figure 3:
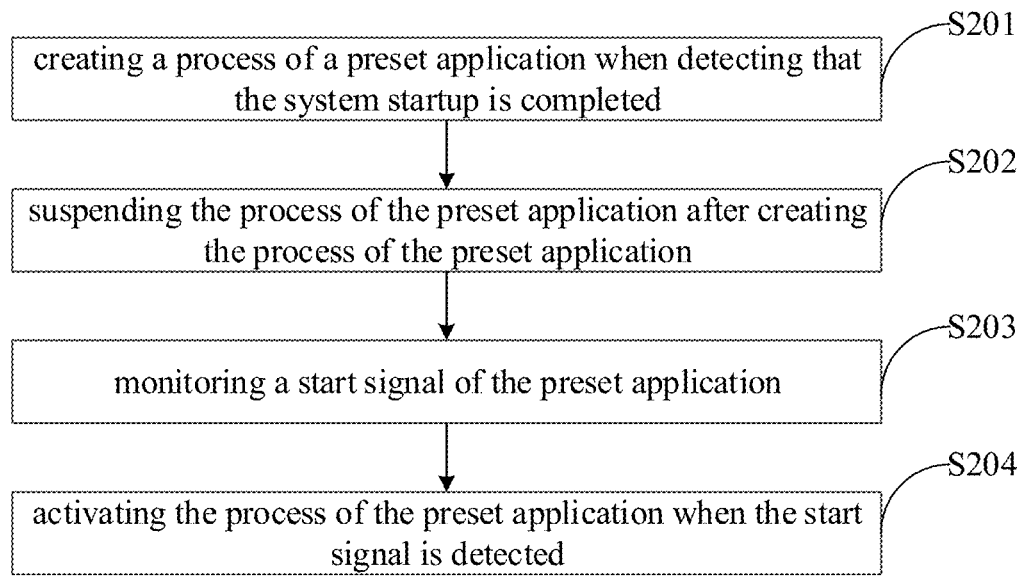
FIG. 3 is a second flow chart of a method for accelerating the startup of an application in an embodiment of the disclosure.

Please referring to FIG. 3, which is another flow chart of a method for accelerating the startup of an application in an embodiment of the disclosure, which is mainly applied to a terminal such as a mobile phone, an IPAD, a computer, and the like. In this embodiment, the method includes the following steps.

S201, a process of a preset application is created, when the system startup is completed.

Figure 4:
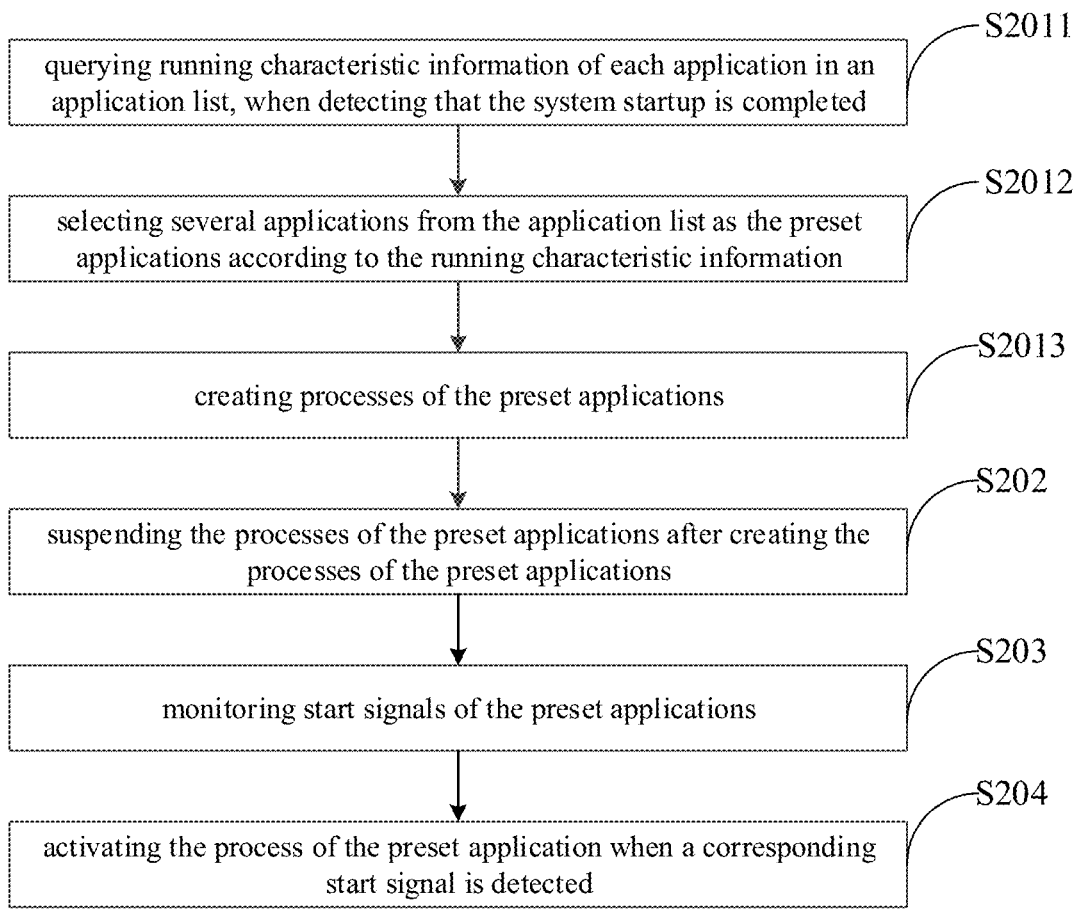
FIG. 4 is a detailed flowchart of the method for accelerating the startup of an application as shown in FIG. 3.

In this step, an application list is formed in the terminal according to the user's manual setting. The application list may also be automatically generated according to the user's usage habits. These applications commonly used by users are listed in the application list. Also referring to FIG. 4, the step S201 specifically includes the following sub-steps.

S2011: running characteristic information of each application in the application list is queried, when detecting that the system startup is completed. The running characteristic information may be the running time or the frequency of use of each application during the last running in the system of the terminal before this startup.

S2012: several applications in the application list are selected as the preset applications, according to the running feature information. In the step S2012, several applications having the longest running time or the highest frequency of use are selected from the application list as the preset applications.

S2013, processes of the preset applications are created. In this step, the processes of the preset applications may be created in sequence, or the processes of the preset applications may be created simultaneously.

S202, the process of the preset application is suspended after creating the process of the preset application.

In this step, after the process of the preset application is successfully created and is delayed a predetermined time, the process of the preset application is suspended. In the specific application process, the system delays n seconds (for example, n=5), and sends a sigstop instruction to the process of the preset application to pause it. Here, the system delays the predetermined time to give the process a certain period of time to perform initializing operations.

S203, a start signal of the preset application is monitored.

After the operation of suspending the process of the preset application in step S102 is completed, a real-time monitoring instruction is turned on to monitor the start signal of the preset application. The start signal mainly refers to receiving an input instruction to open the preset application by manually. For example, it is monitored whether the user clicks the icon of the preset application. Alternatively, the start signal may be automatically triggered by the system, for example, the system automatically generates an instruction to open the Alipay during the payment process.

S204, the process of the preset application is activated when the start signal is detected.

In this step, after the process of the preset application is activated, the running resources are automatically loaded, so that the preset application quickly completes the startup operation.

It can be seen that the embodiment of the disclosure quickly starts a preset application by: creating a process of a preset application; suspending the process of the preset application after creating the process of the preset application; monitoring a start signal of the preset application; and activating the process of the preset application when the start signal is detected. Since the process of the preset application has been pre-established and suspended before the preset application is started, the process is activated when the startup signal of the preset application is detected, so that the preset application can be started quickly, and the startup speed of the application can be improved.

Figure 5:
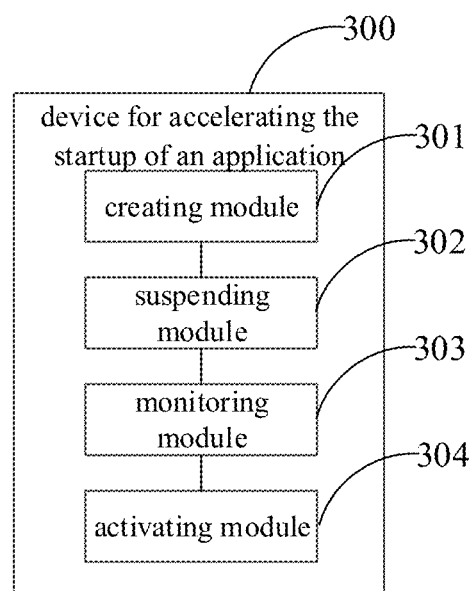
FIG. 5 is a first structural diagram of a device for accelerating the startup of an application in an embodiment of the disclosure.

Please referring to FIG. 5, FIG. 5 is a structural diagram of a device for accelerating the startup of an application in an embodiment of the disclosure, the device is mainly applied to a terminal such as a mobile phone, an IPAD, a computer, and the like. In this embodiment, the device includes a creating module 301, a suspending module 302, a monitoring module 303 and an activating module 304.

The creating module 301 is configured to create a process of a preset application.

Figure 6:
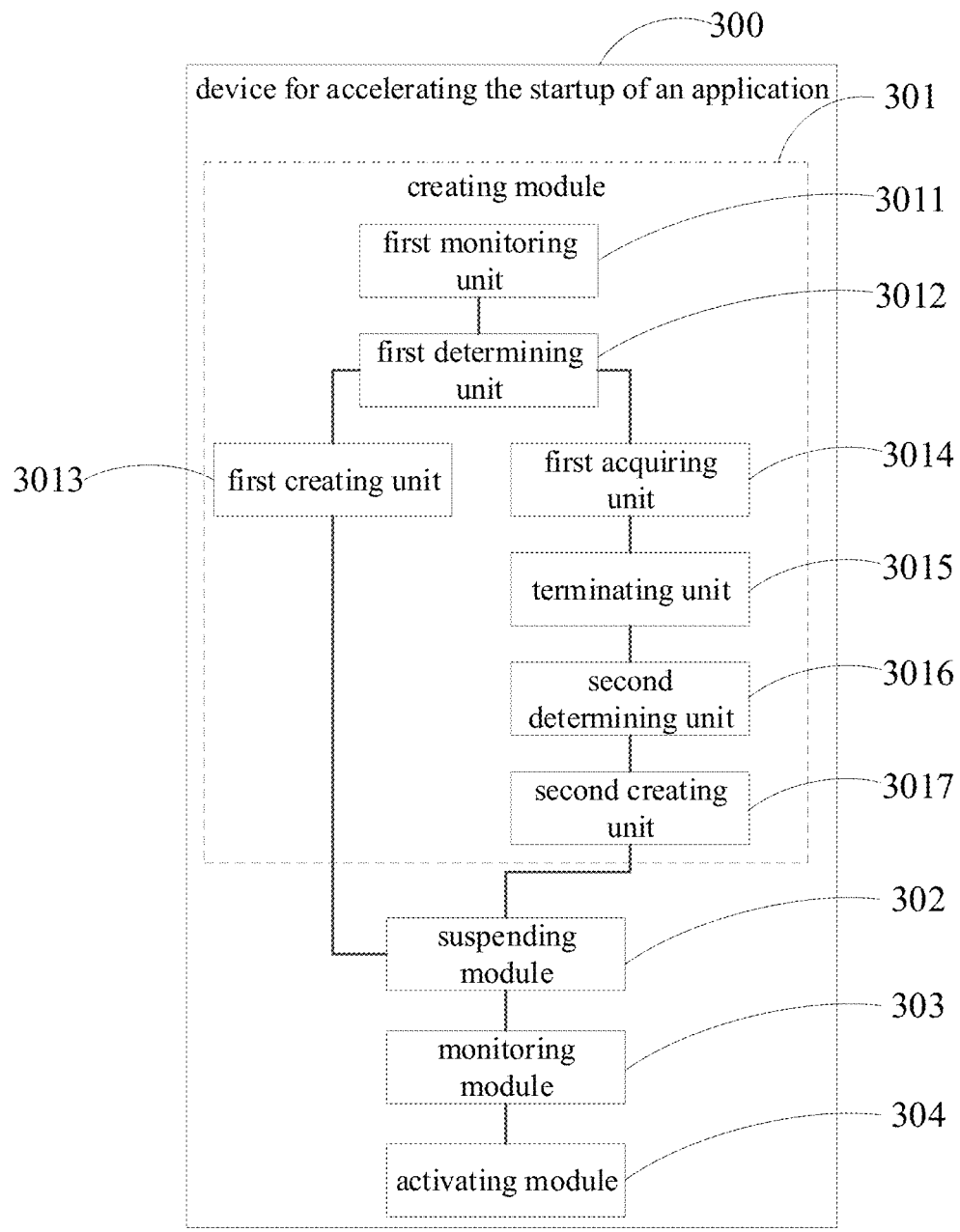
FIG. 6 is a second structural diagram of a device for accelerating the startup of an application in an embodiment of the disclosure.

Please also referring to FIG. 6, in one case, the creating module 301 is configured to re-create a current process of the preset application, when detecting that a previous process of the preset application is ended. The creating module 301 includes a first monitoring unit 3011, a first determining unit 3012, a first creating unit 3013, a first acquiring unit 3014, a terminating unit 3015, a second determining unit 3016, and a second creating unit 3017.

The first monitoring unit 3011 is configured to monitor the process status of each preset application in real time.

The first determining unit 3012 is configured to determine whether a remaining memory used to run applications meets a preset condition, when detecting that a previous process of the preset application is ended. When the process of the preset application ends, the running cache of the preset application is automatically cleared. The preset condition refers to whether the remaining memory is greater than a predetermined value such that the preset application has enough memory to create a process thereof, for example, the predetermined value may be 512 Mb or 1 Gb.

The first creating unit 3013 is configured to re-create the process of the preset application, when the remaining memory meets the preset condition. If the remaining memory is greater than the predetermined value, such as 512 Mb or 1 Gb, the process of the preset application is re-created. In a specific application, the first creating unit 3013 uses a broadcast to force the process of the preset application by simulating the BOOT_COMPLETED broadcast.

The first acquiring unit 3014 is configured to acquire usage characteristic information of at least one application currently running in the background, when the remaining memory does not meet the preset condition. When the remaining memory does not satisfy the preset condition, that is, when the remaining memory is less than the predetermined value, the identification information of the at least one application currently running in the background is extracted. The usage characteristic information of the corresponding application is queried according to the identification information thereof. The usage characteristic information may be a usage frequency of the corresponding application, the time of the last click of the application, the total operation time of each application, and the like.

The terminating unit 3015 is configured to terminate the application whose usage characteristic information meets the preset condition. When the usage characteristic information is the usage frequency of the corresponding application, the applications running in the background are sorted in order of usage frequency from low to high, and close several applications in the front of the order, thus freeing up memory space. For instance, applications such as mobile banking, Alipay, etc., running in the background, are automatically closed to free up memory space.

The second determining unit 3016 is configured to determine whether the remaining memory meets the preset condition, after terminating the applications whose usage characteristic information meets the preset condition.

The second creating unit 3017 is configured to re-create the process of the preset application when the remaining memory meets the preset condition.

Figure 7:
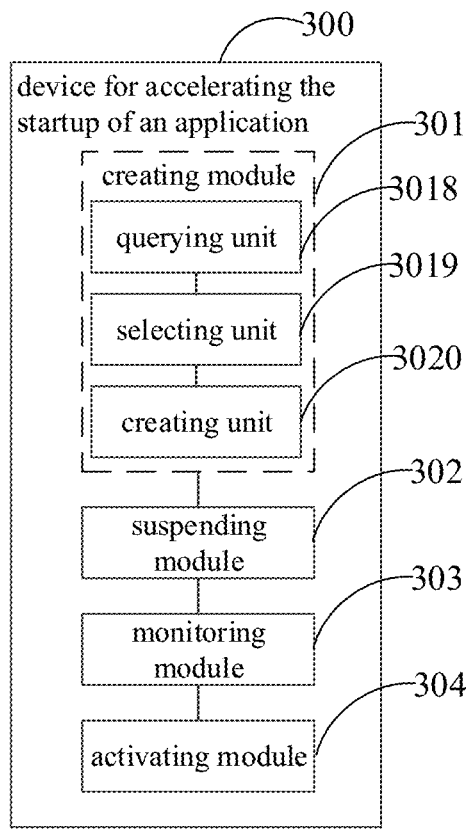
FIG. 7 is a third structural diagram of a device for accelerating the startup of an application in an embodiment of the disclosure.

Referring to FIG. 7, in another case, the creating module 301 is configured to establish a process of the preset application when the system startup is completed. The creating module 301 can include: a querying unit 3018, a selecting unit 3019, and a creating unit 3020.

The querying unit 3018 is configured to query running characteristic information of each application in an application list, when detecting that the system startup is completed. The running characteristic information may be the running time or the frequency of use of each application during the last running in the system of the terminal before this startup. The selecting unit 3019 is configured to select several applications in the application list as the preset applications, according to the running feature information. It selects several applications having the longest running time or the highest frequency of use from the application list as the preset applications. The creating unit 3020 is configured to create processes of the preset applications. The processes of the preset applications may be created in sequence, or the processes of the preset applications may be created simultaneously.

The suspending module 302 is configured to suspend the process of the preset application after creating the process of the preset application. In an actual application, the suspending module 302 is configured to suspend the process of the preset application after it is successfully created a predetermined period of time. After the process of the preset application is successfully established and delayed for a predetermined time, the process of the preset application is suspended. In the specific application process, the system delays n seconds (for example, n=5), and sends a sigstop instruction to the process of the preset application to pause it. Here, the system delays the predetermined time to give the process of the preset application a certain period of time to perform initialization operations.

The monitoring module 303 is configured to monitor a start signal of the preset application. The start signal mainly refers to whether receiving an input instruction to open the preset application by manually. For example, the monitoring module 303 monitors whether the user clicks the icon of the preset application. Alternatively, the start signal may be automatically triggered by the system, for example, the system automatically generates an instruction to open the Alipay during the payment process.

The activating module 304 is configured to activate the process of the preset application when the start signal is detected. After activating the process of the preset application, the running resources are automatically loaded, so that the preset application quickly completes the startup operation.

It can be seen that the embodiment of the disclosure quickly starts a preset application by: creating a process of a preset application; suspending the process of the preset application after creating the process of the preset application; monitoring a start signal of the preset application; and activating the process of the preset application when the start signal is detected. Since the process of the preset application has been pre-established and suspended before the preset application is started, the process is activated when the startup signal of the preset application is detected, so that the preset application can be started quickly, and the startup speed of the application can be improved.

Figure 8:
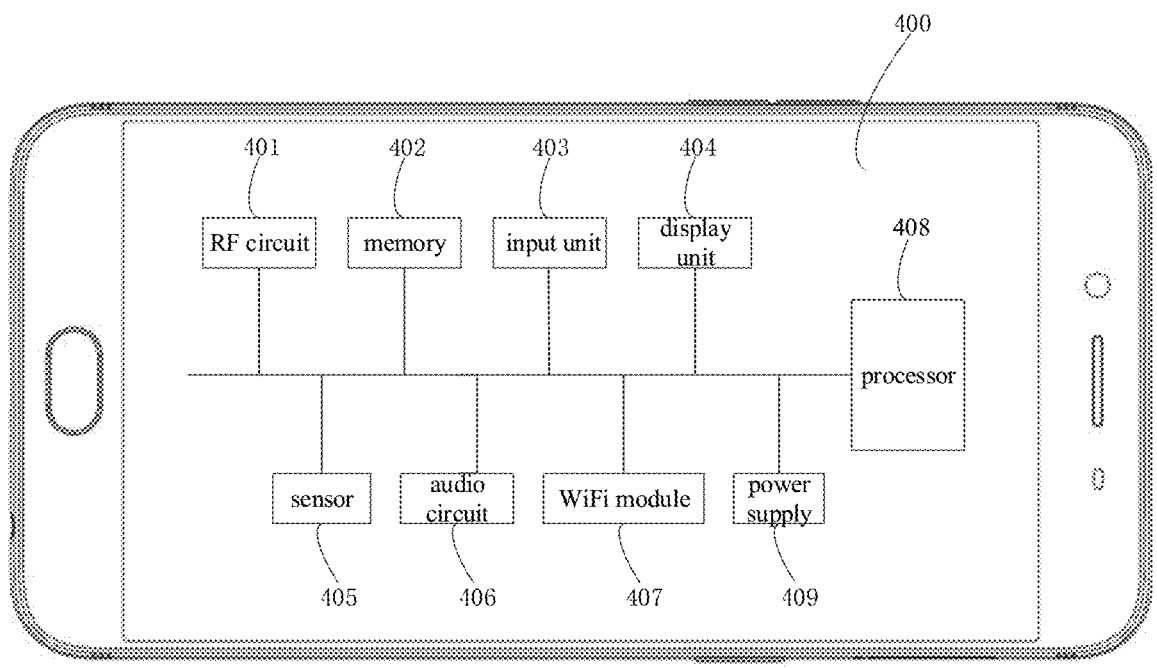
FIG. 8 is a structural diagram of a terminal in an embodiment of the disclosure.

Referring to FIG. 8, an embodiment of the disclosure further provides a terminal, which may include a radio frequency (RF) circuit 401, a memory 402 having one or more computer readable storage media, an input unit 403, a display unit 404, a sensor 405, an audio circuit 406, a wireless fidelity (WiFi) module 407, a processor 408 having one or more processing cores, and a power supply 409 and the like. It will be understood by those skilled in the art that the structure of the terminal as shown in FIG. 8 does not constitute a limitation to the terminal, and the terminal may include more or less components than those illustrated, or a combination of certain components, or different component arrangements.

The RF circuit 401 can be used for transmitting and receiving messages, or transmitting and receiving signals during a call. Specifically, after receiving downlink information of a base station, the downlink information is processed by one or more processors 408. In addition, the data related to the uplink is sent to the base station. Generally, the RF circuit 401 includes, but is not limited to, an antenna, at least one amplifier, a tuner, one or more oscillators, a Subscriber Identity Module (SIM) card, a transceiver, a coupler, a low noise amplifier (LNA), and a duplexer, etc. In addition, the RF circuit 401 can also communicate with the network and other devices through wireless communication. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 402 can be used to store software programs and modules, and the processor 408 executes various functional applications and processing data by running software programs and modules stored in the memory 402. The memory 402 may mainly include a storage program area and a storage data area, wherein the storage program area may store an operating system, applications required for at least one function (such as a sound playing function, an image playing function, etc.), and the like. The storage data area may store the data created by the use of the terminal (such as audio data, phone book, etc.). Moreover, the memory 402 can include high speed random access memory, and can also include non-volatile memory, such as at least one magnetic disk storage device, flash memory device, or other volatile solid state storage device. Accordingly, the memory 402 may also include a memory controller to provide the access to the memory 402 by the processor 408 and the input unit 403.

The input unit 403 can be used to receive input numeric or character information, as well as to generate signal inputs related to user settings and function controls, via a keyboard, a mouse, a joystick, optics or a trackball. In particular, in one particular embodiment, the input unit 403 can include a touch-sensitive surface as well as other input devices. The touch-sensitive surface, also known as touch screens or trackpads, collects touch operations on or near it by a user (such as the user using a finger, stylus, etc., any suitable object or accessory operates on the touch-sensitive surface or near the touch-sensitive surface), and drives the corresponding connecting device according to a preset program. Alternatively, the touch sensitive surface may include two parts of a touch detection device and a touch controller. Wherein, the touch detection device detects the touch orientation of the user, detects a signal brought by the touch operation, transmits the signal to the touch controller; the touch controller receives the touch information from the touch detection device, converts the touch information into contact coordinates, and sends the touch information to the processor 408, and can receive commands from the processor 408 and execute them. In addition, the touch-sensitive surface can be implemented in a variety of types, including resistive, capacitive, infrared, and surface acoustic waves. In addition to the touch-sensitive surface, the input unit 403 can also include other input devices. Specifically, other input devices may include, but are not limited to, one or more of a physical keyboard, function keys (such as volume control buttons, switch buttons, etc.), a trackball, a mouse, a joystick, and the like.

The display unit 404 can be used to display information input by the user or information provided to the user, as well as various graphical user interfaces of the terminal, which can be composed of graphics, text, icons, videos, and any combination thereof. The display unit 404 can include a display panel. Alternatively, the display panel can be configured in the form of a Liquid Crystal Display (LCD), an Organic Light-Emitting Diode (OLED), or the like. Further, the touch-sensitive surface can cover the display panel, and when the touch-sensitive surface detects a touch operation thereon or nearby, it is transmitted to the processor 408 to determine the type of the touch event, and then the processor 408 provides a visible output to the display panel according to the type of the touch event. Although in FIG. 8, the touch-sensitive surface and display panel are implemented as two separate components to perform input and output functions, in some embodiments, the touch-sensitive surface can be integrated with the display panel to implement input and output functions.

The terminal also can include at least one type of the sensor 405, such as a light sensor, a motion sensor, and other sensors. Specifically, the light sensor may include an ambient light sensor and a proximity sensor, wherein the ambient light sensor may adjust the brightness of the display panel according to the brightness of the ambient light, and the proximity sensor may close the display panel and/or the backlight when the terminal moves to the ear of the user. As a kind of motion sensor, a gravity acceleration sensor can detect the magnitude of acceleration in all directions (usually three axes). When it is stationary, it can detect the magnitude and direction of gravity. It can be used to identify the gesture of the mobile phone (such as horizontal and vertical screen switching, related games, magnetometer attitude calibrations), vibration recognition related functions (such as a pedometer, the tapping), etc. Other sensors such as gyroscopes, barometers, hygrometers, thermometers, infrared sensors, etc., also can be disposed in the terminal and are not detailed here.

The audio circuit 406, a speaker, and a microphone can provide an audio interface between the user and the terminal. The audio circuit 406 can convert the received audio data into electrical signals and transmit the electrical signals to the speaker, the speaker converts the electrical signals into sound signals and output the sound signals. On the other hand, the microphone converts the collected sound signals into electrical signals, the electrical signals are received by the audio circuit 406 and then converted into audio data, the audio data is then processed by the processor 408, and then is sent to another terminal via the RF circuitry 401, for example, or the audio data is output to memory 402 for further processing. The audio circuit 406 may also include an earbud jack to provide communication between the peripheral earphone and the terminal.

WiFi is a short-range wireless transmission technology, and the terminal can help users to send and receive emails, browse web pages, and access streaming media through the WiFi module 407, which provides wireless broadband internet access for users. Although FIG. 8 shows the WiFi module 407, it can be understood that it is not the necessary configuration of the terminal, and may be omitted as needed within the scope of not changing the essence of the disclosure.

The processor 408 is the control center of the terminal, which connects various portions of the entire terminal using various interfaces and lines, by performing or executing software programs and/or modules stored in the memory 402, and by invoking data stored in the memory 402, thereby implementing the various functions of the terminal and processing data to monitor the terminal. Optionally, the processor 408 may include one or more processing cores. Optionally, the processor 408 may integrate an application processor and a modem processor, where the application processor mainly processes the operating system, the user interfaces, the applications, and the like, and the modem processor primarily handles wireless communications. It will be appreciated that the above described modem processor may also not be integrated into the processor 408.

The terminal also includes the power supply 409 (such as a battery) that supplies power to the various components. Optionally, the power supply 409 can be logically coupled to the processor 408 through a power management system to manage functions such as charging, discharging, and power management through the power management system. The power supply 409 may also include one or more of DC or AC power source, a recharging system, a power failure detection circuit, a power converter or inverter, a power status indicator, and the like.

Although not shown, the terminal may further include a camera, a Bluetooth module, and the like, and details are not described herein again. Specifically, in this embodiment, the processor 408 of the terminal can, according to the following instructions, load executable files corresponding to the processes of one or more applications into the memory 402, and executes the application programs stored in the memory, thereby to perform the following functions:

creating a process of a preset application;
suspending the process of the preset application after creating the process of the preset application;
monitoring a start signal of the preset application; and
activating the process of the preset application when the start signal is detected, The disclosure can quickly start a preset application by: creating a process of a preset application; suspending the process of the preset application after creating the process of the preset application; monitoring a start signal of the preset application; and activating the process of the preset application when the start signal is detected. Since the process of the preset application has been pre-established and suspended before the preset application is started, the process is activated when the startup signal of the preset application is detected, so that the preset application can be started quickly, and the startup speed of the application can be improved.

Various operations of the embodiments are provided herein. In one embodiment, the one or more operations may constitute computer readable instructions stored on one or more computer readable media that, when executed by a terminal, cause the computing device to perform the operations. The order in which some or all of the operations are described should not be construed as implying that the operations must be sequential. Those skilled in the art will understand alternative orders with effects as described in the specification. Moreover, it should be understood that not all operations must be present in every embodiment provided herein.

Moreover, the term "preferred" or "optionally" as used herein is intended to serve as an example, instance, or illustration. Any aspect or design described as "preferred" or "optionally" by the description is not necessarily to be construed as being more advantageous than other aspects or designs. Instead, the use of the word "preferred" or "optionally" is intended to present a concept in a specific manner. The term "or" as used in this application is intended to be inclusive rather than exclusive. That is, unless otherwise specified or clear from the context, "X employs A or B" means naturally including any one of the permutations. That is, in the cases such as X uses A, X uses B, or X uses both A and B, "X uses A or B" is satisfied in any of the foregoing examples.

Also, the present disclosure has been shown and described with respect to the embodiments, equivalent variations and modifications will occur to those skilled in the art in view of this disclosure and the description. The present disclosure includes all such modifications and variations, and is only limited by the scope of the appended claims. With particular regard to various functions performed by the above-described components (e.g., elements, resources, etc.), the terms used to describe such components are intended to the components (unless otherwise indicated) correspond to performing the specified functions (e.g., they are functionally equivalent), even the components are not equivalent in structure to the disclosed structure for performing the functions in the exemplary implementations of the present disclosure as shown herein. Moreover, although certain features of the present disclosure have been disclosed with respect to only one of several implementations, such features may be combined with one or more other features of other implementations as may be desired and advantageous for a given or particular application. Furthermore, the terms "comprising," "having," "including" or variations thereof are used in the particular embodiments or claims, and such terms are intended to be encompassed in a manner similar to the term "comprising."

Each functional unit in the embodiment of the disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as stand-alone products, may also be stored in a computer readable storage medium. The above mentioned storage medium may be a read only memory, a magnetic disk or an optical disk or the like. Each of the above described devices or systems can perform the methods of the corresponding method embodiments.

In the above, the present disclosure has been disclosed in the above embodiments, but the embodiments are not intended to limit the present disclosure. Those skilled in the art can make various modifications without departing from the spirit and scope of the disclosure, and the scope of the disclosure is defined by the scope of the claims.

What is claimed is:

1. A method for accelerating startup of an application, comprising:
    monitoring in real time a process status of each preset application that is currently running and included in an application list, wherein the application list is preset in a terminal according to user's manual setting and the preset applications included in the application list are installed in the terminal;
    comparing a remaining memory currently available with a predetermined value, in response to detecting a process of a preset application included in the application list ends;
    in response to determining that the remaining memory is not greater than the predetermined value, terminating at least one application which is currently running in background and whose usage characteristic information meets a preset condition, to increase the remaining memory;
    re-creating the process of the preset application, in response to determining that the increased remaining memory is greater than the predetermined value;
    suspending the re-created process of the preset application, in response to the process of the preset application being re-created and initializing operations of the re-created process of the preset application being performed;
    monitoring a start signal of the preset application; and
    activating the suspended process of the preset application, in response to the start signal of the preset application being detected.

2. The method according to claim 1, wherein the method further comprises:
    acquiring the usage characteristic information of the at least one application currently running in the background, in response to determining that the remaining memory is not greater than the predetermined value.

3. The method according to claim 2, wherein the usage characteristic information comprises a usage frequency, a time of the last click, and a total operation time of each application.

4. The method according to claim 2, wherein the acquiring the usage characteristic information of the at least one application currently running in the background comprises:
    extracting identification information of the at least one application currently running in the background; and
    querying usage characteristic information of the at least one application currently running in the background, according to the respective identification information.

5. The method according to claim 1, wherein the method further comprises:
    creating a process of a preset application included in the application list, in response to detecting that system startup is completed.

6. The method according to claim 5, wherein the operation of creating a process of a preset application included in the application list comprises:
    querying running characteristic information of each application in the application list, in response to detecting that the system startup is completed;
    selecting at least one application from the application list as the preset application according to the running characteristic information; and
    creating a process of the at least one preset application.

7. The method according to claim 6, wherein the running characteristic information comprises a running time or a frequency of use of each application during the last running in a system of the terminal before this system startup.

8. The method according to claim 7, wherein the selecting at least one application from the application list as the preset application according to the running characteristic information comprises:
    selecting, as the preset application, an application having a longest running time or a highest frequency of use from the application list.

9. The method according to claim 1, wherein the initializing operations of the re-created process of the preset application is performed within.

10. The method according to claim 1, wherein there are a plurality of applications running in the background, and the operation of terminating at least one application which is currently running in background and whose usage characteristic information meets a default terminating condition comprises:
    sorting the applications running in the background in order of usage frequency from low to high; and
    terminating at least one application in front of the order.

11. The method according to claim 1, wherein the operation of monitoring a start signal of the preset application comprises:
    monitoring a start signal of the preset application generated by manually input.

12. The method according to claim 1, wherein the operation of monitoring a start signal of the preset application comprises:
    monitoring a start signal of the preset application automatically trigged by the system.

13. The method according to claim 1, wherein there are a plurality of applications running in the background, the usage characteristic information comprises a usage frequency (f), a time (t) of a last click, and a total operation time (L) of each application, and the operation of terminating at least one application which is currently running in background and whose usage characteristic information meets a default terminating condition comprises:
  calculating characteristic values (Q) of the usage characteristic information of the plurality of applications running in the background, according to a formula Q=af+bT+cL, where a, b, and c are coefficients;
  sorting the applications running in the background in order of the characteristic values from small to large; and
  terminating at least one application in front of the order.

14. The method according to claim 1, wherein the method further comprises: re-creating directly the process of the preset application, in response to determining that the remaining memory is greater than the predetermined value.

15. The method according to claim 1, wherein the method further comprises: automatically clearing a running cache of the preset application, in response to detecting the process of the preset application included in the application list ends.

16. The method according to claim 1, wherein the suspending the re-created process of the preset application comprises:
  sending a sigstop signal instruction to the re-created process of the preset application to pause it.

17. A terminal, comprising a memory, a processor, and a computer program stored in the memory and executable for the processor, wherein the processor performs a method for accelerating startup of an application when executing the computer program, the method comprises:
  monitoring in real time a process status of each preset application that is currently running and included in an application list, wherein the application list is preset in the terminal according to user's manual setting and the preset applications included in the application list are installed in the terminal;
  comparing a remaining memory currently available with a predetermined value, in response to detecting a process of a preset application included in the application list ends;
  in response to determining that the remaining memory is not greater than the predetermined value, terminating at least one application which is currently running in background and whose usage characteristic information meets a preset condition, to increase the remaining memory;
  re-creating the process of the preset application, in response to determining that the increased remaining memory is greater than the predetermined value;
  suspending the re-created process of the preset application, in response to the process of the preset application being re-created and initializing operations of the re-created process of the preset application being performed; and
  activating the suspended process of the preset application in response to a start signal of the preset application being detected.

18. The terminal according to claim 17, wherein the method further comprises: re-creating directly the process of the preset application, in response to determining that the remaining memory is greater than the predetermined value.

19. The terminal according to claim 17, wherein the method further comprises:
  creating a process of a preset application included in the application list, in response to detecting that system startup is completed.

20. The terminal according to claim 17, wherein the suspending the re-created process of the preset application comprises:
  sending a sigstop signal instruction to the re-created process of the preset application to pause it.

* * * * *